United States Patent [19]

Kraus et al.

[11] 3,727,466
[45] Apr. 17, 1973

[54] GYRO NOISE REDUCTION

[75] Inventors: Gerald M. Kraus, Marine on Saint Croix; John G. Rupert, St. Paul, both of Minn.

[73] Assignee: Honeywell, Inc., Minneapolis, Minn.

[22] Filed: July 23, 1970

[21] Appl. No.: 57,558

[52] U.S. Cl. ................................. 74/5 R, 74/5.7
[51] Int. Cl. ................................. G01c 19/04
[58] Field of Search .................. 74/5, 5.7, 5.4, 5.41, 74/5.6, 5.46; 33/72 G, 226 R; 102/DIG. 3; 181/33 K

[56] References Cited

UNITED STATES PATENTS

| | | | |
|---|---|---|---|
| 3,001,290 | 9/1961 | Rellensmann | 33/226 R |
| 2,785,573 | 3/1957 | Bentley | 74/5 |
| 3,258,976 | 7/1966 | Krupick et al. | 33/72 G |
| 2,924,978 | 2/1960 | Barnes | 74/5 |
| 1,486,261 | 3/1924 | Norden | 74/5.7 |
| 2,588,607 | 3/1952 | Barkalow | 74/5.47 |
| 3,263,507 | 8/1966 | Appleton | 74/5.37 X |

FOREIGN PATENTS OR APPLICATIONS 538,182   3/1957   Canada ........................ 74/5

Primary Examiner—Manuel A. Antonakas
Attorney—Charles J. Ungemach and Ronald T. Reiling

[57] ABSTRACT

A method and apparatus for reducing output noise from a gyro having a spinning inertial element surrounded by gas. The mass of gas spinning with the rotor is minimized by shrouding the rotor. Particular shrouding reduces the Reynolds number of the gas proximate the rotor thereby producing a steady laminar gas flow within the gyro gimbal; the elimination of unsteady turbulent flow within the gimbal is accompanied by considerable noise reduction.

6 Claims, 2 Drawing Figures

PATENTED APR 17 1973 3,727,466

INVENTORS
GERALD M. KRAUS
JOHN G. RUPERT
BY Ronald T. Reiling
ATTORNEY

GYRO NOISE REDUCTION

BACKGROUND OF THE INVENTION

This invention relates to a method and apparatus for reducing extraneous gyro output signals which tend to interfere with reception of the desired output signals. In the terminology of the gyro art, the invention is directed to reducing output noise.

A gyro within the purview of this invention employs a spinning rotor as an inertial element; the rotor is surrounded by gas. Since it has been recognized in the art that the ratio of the angular momentum of the surrounding gas to the angular momentum of the rotor is a determining factor in the ability of the gyro to accurately measure low input rates, the gas is typically a mixture of helium and hydrogen. By using a light gas, the angular momentum of the gas at a particular operating speed is reduced. This in turn reduces noise torques produced by the spinning gas, improving the accuracy of the gyro.

Further noise reduction has been accomplished by reducing the pressure of the gas. Reduced gas pressure results in a reduced mass of gas spinning proximate the gyro rotor and consequently results in output noise reduction, again because the ratio of the angular momenta of the gas and rotor is reduced. However, this approach has offered only moderate noise reduction. It is unsuitable for more sophisticated gyros of the type employing gas bearings since a reduction in gas pressure is necessarily accompanied by an intolerable reduction in bearing stiffness.

Although both of these techniques reduce gyro output noise, noise levels nevertheless remained objectionably high for many gyro applications. The possibility that the nature of the gas flow within the gimbal might determine output noise went unconsidered, uninvestigated, and unrecognized by the artisan. Consequently, until the present invention, further noise reduction eluded those skilled in the gyro art.

BRIEF SUMMARY OF THE INVENTION

The crux of the present invention is the discovery that turbulent gas flow within the gyro gimbal is a major source of gyro output noise. Output noise is defined as extraneous output signals which tend to interfere with reception of the desired output signals. The present invention is directed to a method and apparatus for reducing gyro output noise by first further reducing the mass of gas spinning with the rotor and secondly by eliminating turbulent gas flow within the gimbal and instead establishing a steady laminar flow. Turbulent flow as used in the fluid arts, as well as this specification, denotes a macroscopically disordered flow where particles execute a sinuous or nearly random fluctuating motion about the mean velocity. In contrast, laminar flow is macroscopically well ordered flow where fluid layers are assumed to smoothly slide over one another along lines. Steady laminar flow within the gimbal may be established by surrounding the gyro rotor with a shroud or by reducing the Reynolds number of the gas within the gimbal below the critical Reynolds number, the critical Reynolds number being the lowest Reynolds number at which unsteady flow can exist.

Tests with gyros employing the instant invention have shown that maintaining laminar gas flow within the gyro gimbal can reduce output noise by an order of magnitude. Since meeting noise level requirements is a recurring problem in the gyro art, such a reduction represents a significant advance in the state of the art. The contribution of this invention becomes even more appreciated when it is realized that output noise level is often of paramount importance when selecting a gyro for a particular application.

When laminar flow is established and maintained by shrouds according to the present invention, no reduction in gas pressure results. Thus, the shrouds are especially suited to gas bearing gyros since the shrouds in no way affect bearing stiffness. The shrouds are relatively inexpensive to construct and do not significantly increase either the gyro weight or the anisoelasticity coefficient. In addition, they result in no increase in power consumption; to the contrary, the inclusion of shrouds will in some instances actually reduce power consumption.

DESCRIPTION OF THE PREFERRED EMBODIMENT

Figure 1:
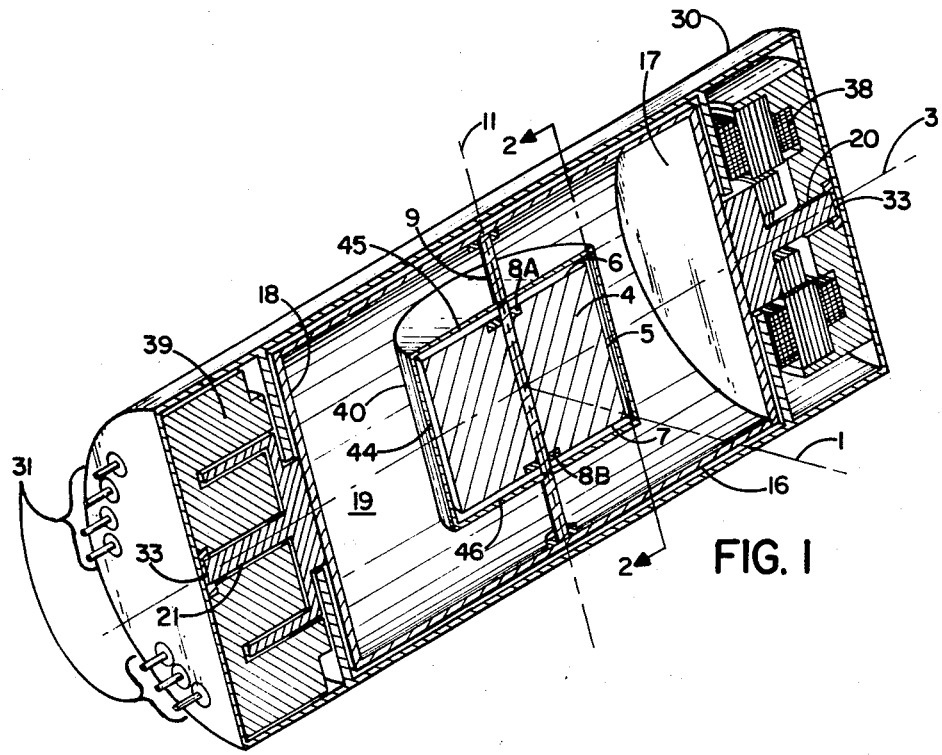
FIG. 1 is a cross-sectional view of a typical gyro showing shrouds in accordance with our invention.

Preferred apparatus for establishing and maintaining a steady laminar gas flow within a gyro gimbal is illustrated in FIG. 1. Referring to FIG. 1, a gyro having an input axis 1 and an output axis 3 employs a conventional rotor 4. Rotor 4 has a cylindrical face 5 and circular end faces 6 and 7, and is mounted on bearings 8A and 8B such that rotor 4 may rotate about a shaft 9. Bearings 8A and 8B may be conventional ball bearings, gas bearings, or any other suitable bearing means employed in the art. Shaft 9 is coincident with gyro spin axis 11 and is attached to the inside of a conventional floated gimbal 16 such that spin axis 11 is at a diameter of the circular cross-section of gimbal 16. Gimbal 16 has circular ends 17 and 18. Attached to the center of end 17 is a shaft 20 and similarly attached to end 18 is a shaft 21. The gimbal assembly including gimbal 16 and shafts 20 and 21 is mounted within a generally cylindrical case 30 such that shafts 20 and 21 are coincident with output axis 3; output axis 3 thus passes through the center of gimbal ends 17 and 18. The gimbal assembly is mounted within case 30 by means of conventional pivot jewels 33 for free rotation about output axis 3. For simplicity, pivot jewels 33 are shown between the ends of shafts 20 and 21 and the respective ends of case 30. In practice, other apparatus such as temperature compensating bellows or adjustment devices might be between pivot jewels 33 and case 30.

The gyro also includes a conventional signal generator 38 about shaft 20 and a conventional torque generator 39 about shaft 21. Because both the signal generator 38 and the torque generator 39 are well known in the art and because their particular features bear no relation to the present invention, neither is described in detail. At one end of case 30 are several terminal pins 31 for providing electrical connections to the gyro.

The hollow interior 19 of gimbal 16 is occupied by gas, typically a mixture of helium and hydrogen. Rotor 4 is caused to spin about shaft 9 by any spinmotor means known in the gyro art; for clarity, no motor is illustrated.

To eliminate turbulent flow within gimbal 16, the rotor is surrounded by a shroud 40 having a cylindrical interior face 44 between circular ends 45 and 46. Shroud 40 is mounted on shaft 9 such that shaft 9 extends through the centers of ends 45 and 46.

Figure 2:
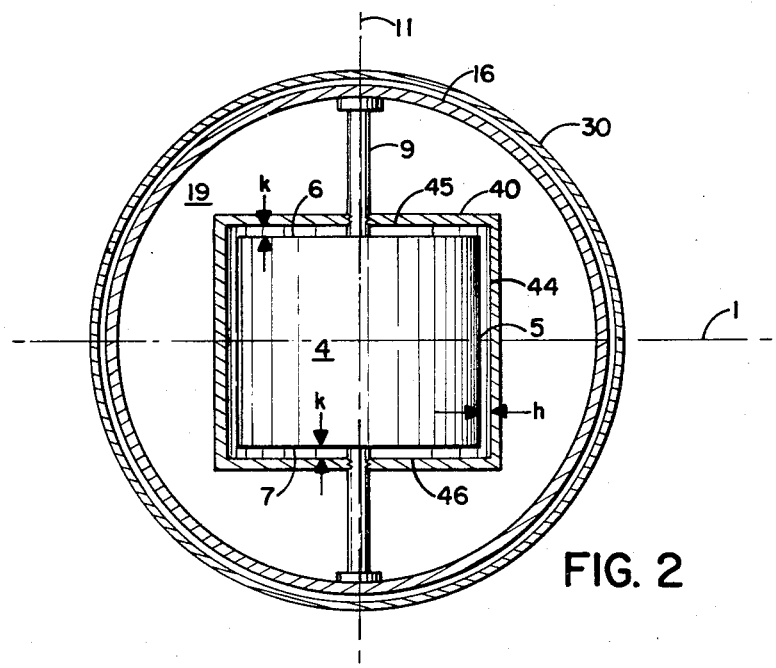
FIG. 2 is a partial cross-sectional view of the gyro of FIG. 1 taken along section line 2—2.

Referring to FIG. 2, in which like numbers indicate elements similar to those of FIG. 1, shroud 40 is mounted such that cylindrical face 44 is separated a distance h from the extremity of the cylindrical face 5 of rotor 4, and circular faces 45 and 46 are separated a distance k from the circular faces 6 and 7 of rotor 4.

An arbitrary choice for distances h and k yields reduced gyro output noise because the gas outside the shroud 40 is no longer affected by the spinning rotor but instead is substantially stagnant. That is, the only gas spinning is that within the confines of the shroud. Because the mass of spinning gas is reduced, the angular momentum of the gas is accordingly reduced. Since the angular momentum of rotor 4 is constant for a given spin speed, the ratio of the angular momentum of the gas to the angular momentum of the rotor is reduced. As explained previously, a reduction in that ratio of momenta is accompanied by a reduction in output noise.

It has been discovered that if distances h and k are critically selected, additional noise reduction is obtained. The gas flow near the cylindrical rotor face 5 is best described by a Reynolds number which takes into account both the radius of the rotor and the width of the gap between the rotor and the shroud. Specifically, $$\mathrm{Rey} = \frac{\rho v h}{\mu} \sqrt{\frac{h}{r}}$$

where Rey is the Reynolds number, $\rho$ the mass density of the gas, $v$ the gas velocity, $\mu$ the gas viscosity, $r$ the radius of the rotor, and $h$ as above, is the distance between the rotor and the shroud. Gas flow in the area between the rotor face 5 and shroud face 44 will be laminar and steady when Rey < 41. Thus, by establishing a gap h such that Rey < 41, gyro output noise is additionally reduced by the elimination of unsteady gas flow within the gimbal interior 19.

Still further noise reduction will be realized where steady laminar gas flow is established and maintained near the circular rotor end faces 6 and 7. If distance k is selected to be less than twice the boundary layer thickness of the gas at rotor faces 6 and 7, centrifugal pumping effects will establish a radial pressure gradient on the rotor faces 6 and 7, but because there is no gas source at the center of the respective rotor faces, there will be no gas flow across faces 6 and 7 after the pressure gradient is established. This will occur shortly after rotor 4 has reached operating spin speed. Consequently, noise will be still further reduced by this elimination of unsteady flow within the gimbal.

For simplicity, the gyro rotor has been illustrated as a cylinder. It is realized that many gyros have more sophisticated rotors with different radii at various points along the spin axis. The present invention may be employed in those gyros by merely constructing the shroud to conform to the rotor shape. The distance k would then be measured between the shroud and any circular rotor face, and the distance h between the shroud and any cylindrical face.

In summary, we have shown apparatus for eliminating gyro output noise by reducing the mass of gas spinning with the spinning rotor. We have discovered that turbulent gas flow within the gimbal is a major contributor to output noise and have shown a method and preferred apparatus for minimizing output noise by eliminating this turbulent flow and instead establishing steady laminar flow. While we have shown shrouds for preventing unsteady flow, those skilled in the art will recognize other schemes for accomplishing a similar result. For example, if minimizing the weight of the gimbal were not important in a particular gyro, the gimbal interior could be shaped to conform to the rotor surface, accomplishing the same result as the illustrated shroud. The term "shroud means" encompasses both these embodiments, as well as others apparent to those skilled in the art.

We claim as our invention:

1. Low noise gyroscope apparatus comprising:
   a. a gyroscope having a spinning rotor inertial element;
   b. first means for surrounding said spinning rotor inertial element with gas; and
   c. stationary shroud means spaced a distance h from the inertial element for the purpose of establishing and maintaining the Reynolds number of the flow of the gas proximate said inertial element below the critical Reynolds number during times when the inertial element is at operating speed, whereby steady laminar flow of the gas proximate said inertial element is maintained.

2. The apparatus of claim 1 wherein the spinning rotor inertial element has a cylindrical face, and the shroud means is configured so that the distance h between the cylindrical rotor face and the shroud means satisfies the condition Rey < 41, where $$\mathrm{Rey} = \frac{\rho v h}{\mu} \sqrt{\frac{h}{r}}$$

Rey being the Reynolds number of gas within the shroud, $\rho$ the mass density of the gas, $v$ the gas velocity, $\mu$ the gas viscosity and $r$ the radius of the rotor.

3. The apparatus of claim 1 wherein the spinning rotor inertial element has a circular face, and the shroud means is configured so that the distance between a circular rotor face and the shroud means is less than twice the boundary layer thickness of the gas proximate the circular rotor face during times when said inertial element is at operating speed.

4. The apparatus of claim 1 wherein the spinning rotor inertial element has a cylindrical face, and the shroud means is configured so that, for all points on the face which are an equal distance from the rotor spin axis, the distance between those points and the shroud means is equal.

5. A method for minimizing output noise in a gyro having a spinning rotor inertial element surrounded by gas, comprising establishing and maintaining steady laminar gas flow proximate said inertial element, by maintaining the Reynolds number of said flow below the critical Reynolds number.

6. The method of claim 5 wherein establishing and maintaining steady laminar gas flow is accomplished by surrounding the rotor with stationary shroud means spaced a predetermined distance from the rotor.

* * * * *